(12) United States Patent
Barowski et al.

(10) Patent No.: US 6,968,476 B2
(45) Date of Patent: Nov. 22, 2005

(54) CHECKPOINTING A SUPERSCALAR, OUT-OF-ORDER PROCESSOR FOR ERROR RECOVERY

(75) Inventors: Harry Stefan Barowski, Boeblingen (DE); Hartmut Schwermer, Stuttgart (DE); Hans-Werner Tast, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/180,385

(22) Filed: Jun. 26, 2002

(65) Prior Publication Data
US 2003/0005265 A1 Jan. 2, 2003

(30) Foreign Application Priority Data
Jun. 27, 2001 (EP) .................................. 01115448

(51) Int. Cl.[7] .............................................. G06F 11/00
(52) U.S. Cl. ..................... 714/15; 712/227; 712/228
(58) Field of Search ............................. 712/218, 227, 712/228; 714/15, 17

(56) References Cited

U.S. PATENT DOCUMENTS 6,115,730 A * 9/2000 Dhablania et al. .......... 708/505
6,581,155 B1 * 6/2003 Lohman et al. ............. 712/222
6,785,842 B2 * 8/2004 Zumkehr et al. ............ 714/17
6,810,489 B1 * 10/2004 Zhang et al. .................. 714/6
2004/0221212 A1 * 11/2004 Ando ......................... 714/724

* cited by examiner

Primary Examiner—Robert Beausoliel
Assistant Examiner—Marc Duncan
(74) Attorney, Agent, or Firm—Lynn L. Augspurger

(57) ABSTRACT

The present invention relates to data processing systems with built-in error recovery from a given checkpoint. In order to checkpoint more than one instruction per cycle it is proposed to collect updates of a predetermined maximum number of register contents performed by a respective plurality of CISC/RISC instructions in a buffer (CSB)(60) for checkpoint states, whereby a checkpoint state comprises as many buffer slots as registers can be updated by said plurality of CISC instructions and an entry for a Program Counter value associated with the youngest external instruction of said plurality, and to update an Architected Register Array (ARA)(64) with freshly collected register data after determining that no error was detected in the register data after completion of said youngest external instruction of said plurality of external instructions. Handshake synchronization for consistent updates between storage in an L2-cache (66) via a Store Buffer (65) and an Architected Register Array (ARA) (64) is provided which is based on the youngest instruction ID (40) stored in the Checkpoint State Buffer (CSB) (60).

13 Claims, 4 Drawing Sheets

| EXTERNAL INSTRUCTION | TARGET REGISTER ADDRESS | TARGET REGISTER DATA | PROGRAMM COUNTER |
|---|---|---|---|
| CISC #0 | 10x | 0000 000F | 0000 1FFE |
| CISC #0 | - | | " |
| CISC #0 | 2Fx | 1111 1111 | " |
| CISC #0 | - | | " |

| EXTERNAL INSTRUCTION | TARGET REGISTER ADDRESS | TARGET REGISTER DATA | PROGRAMM COUNTER |
|---|---|---|---|
| CISC #0 | 12X | 0000 100F | 0000 1FFE |
| CISC #0 | 30X | 0000 0000 | 0000 1FFE |
| CISC #1 | 2FX | 1111 1111 | 0000 2002 |
| CISC #2 | 0BX | 1010 1010 | 0000 2006 |

|  | SLOT 0 | SLOT 1 | SLOT 2 | SLOT 3 | PC | ID | GLUE/LINK BIT ← 72 |
|---|---|---|---|---|---|---|---|
|  |  |  |  |  |  |  |  |
|  |  |  |  |  |  |  |  |
|  | EXTENDED CHECKPOINT STATE | | | |  |  | 1 |
|  |  |  |  |  |  |  | 1 |
|  |  |  |  |  |  |  |  |
|  |  |  |  |  |  |  |  |
|  |  |  |  |  |  |  |  |
|  |  |  |  |  |  |  |  |

FIG. 7

CHECKPOINTING A SUPERSCALAR, OUT-OF-ORDER PROCESSOR FOR ERROR RECOVERY

BACKGROUND OF THE INVENTION

The present invention relates to a method and a system for checkpointing a multiple processor data processing system in order to provide for error-recovery.

To allow high instruction level parallelism in modern processors several instructions can be executed and finally retired in parallel. This is essential, if complex instructions of a CISC processor are translated in several simpler RISC like instructions and if the number of instructions which are executed per cycle (IPC) should be high. Retiring of these instructions means that the contents of the architected register array are updated with the result of the internal instructions and the corresponding store data are written back into the cache/memory. In order to reflect the instruction sequence given by a program the retirement, i.e. completion of instructions occurs in conceptual order. Thus the terms "younger" and "older" instructions represent instructions found later or earlier, respectively, in an instruction sequence. Checkpointing means, that snapshots of the state of the architected registers and the corresponding data stored in the data cache, are taken at a certain frequency, i.e. a fixed time interval. Highest resolution is obtained if the snapshots are taken every cycle.

Such a prior art checkpointing method is disclosed in U.S. Pat. No. 5,418,916. A checkpoint retry facility utilizes a store buffer in order to establish a store queue during normal operation and for providing the data necessary for checkpoint retry during a retry operation. The data buffered therein also includes the register data of the floating point registers, the general-purpose registers and the access registers, and the program status word.

This is basically done with the help of a plurality of store buffers associated with the L1-Cache of each of the processing units. Each of the store buffers is used as an intermediate buffer for holding the storage data until such data can be released to any other portions of the storage hierarchy where other CPUs can then access the data.

In order to control the release of storage data two information bits are installed in the store queue design: the "end of instruction" (EOI) bit and the "checkpoint complete" (COMP) bit. The data in the store buffer is available only to the processor directly associated with it. Other processors cannot access this data until it is written to the L2-cache or the memory, which is public to all other processors. This prior art approach, however, has some weaknesses when it is required to checkpoint more than one external instruction (CISC) per cycle: At most, a single instruction can be checkpointed per cycle.

SUMMARY OF THE INVENTION

It is thus an object of the present invention to provide an improved method and system for checkpointing superscalar systems in which more than one external instruction can be checkpointed per cycle.

If the processor is able to retire a certain (maximum) number of internal RISC-like instructions per cycle and the number of internal instructions representing an external CISC instruction is not fixed, e.g. is depending on the operation code, checkpointing of the processor's state may be based on multiples of external instructions.

An introductory example is shown in FIG. 1 It is assumed that a CISC instruction 42 having a unique External Instruction ID 40 (EID) of a processor can be translated into one to four internal instructions 44 which act on architected registers and into one to four load/store instructions 46 which deal with data fetches and stores from the cache/memory.

Assuming that a maximum of four internal instructions can be retired simultaneously implies that up to four external CISC instructions must be checkpointed, if snapshots of the processor's state are taken every cycle.

The checkpointing of the processor's architected registers may be done by copying the register contents into a checkpointing array where every register possesses a master copy. The checkpointing of store data may be based on the memory hierarchy where the store data may first be written back into a low order (e.g. L1) cache but are released in a higher order cache memory (e.g. L2) upon completion of a checkpoint. To ensure that register based internal instructions and the corresponding store instructions can be related to the external instructions these instructions must be tagged with a unique instruction identifier number (ID).

According to its broadest aspect, a method for checkpointing a single or multiple processor data processing system is provided in order to achieve error-recovery, which is characterized by the steps of:

a.) collecting updates of a predetermined maximum number of register contents, e.g., a maximum number of four register updates performed by a respective plurality of CISC/RISC instructions in a checkpoint state buffer, a checkpoint state comprising:

as many buffering slots as registers can be updated by said plurality of (CISC-derived) instructions, and an entry for a Program Counter value associated with the youngest external instruction of said plurality, b.) updating an Architected Register Array (ARA) with freshly collected register data after determining that no error was detected in the register data after completion of said youngest external instruction of said plurality of external instructions.

Thus, the advantage results that an instruction sequence comprising more than one external instruction operating each on registers can be checkpointed per cycle.

An object of the present invention is to update the register contents performed by one or several external CISC instructions per cycle are collected by forming said checkpoint states. A checkpoint state preferably consists of as many slots as registers can be updated by one or several CISC instructions per cycle. In addition every instruction will update the processor's status, e.g. the program counter. For checkpointing several instructions only the final status is of importance, e.g., if several external CISC instructions are completed simultaneously the program counter is determined by the last instruction completed within the sequence of external instructions.

If no error has been detected in program runtime this checkpoint state is (finally) used to perform the update of the checkpointing array. This update may occur several cycles after the checkpoint state has been built up. Several checkpoint states may be collected in a checkpoint state buffer (CSB) which collects a new checkpoint state every cycle until the checkpoint states are finally used for the update of the checkpointing array, e.g., the above ARA. If an error in the processor is detected, the checkpointing array update mechanism is immediately blocked thus preventing that corrupted data is poisoning the checkpointing array.

When, further the disclosed method comprises the step of providing Error Detection and Correction (ECC) bits with the ARA entries an efficient and area-saving error correction facility will be provided against bit failures.

When, further the disclosed method comprises the steps of:

a.) providing in parallel to said ARA update a second control path which controls the release of STORE data resulting from a plurality of STORE instructions from a Store Buffer (STB) into an architected state cache memory, and b.) synchronizing said STORE data release with said ARA update by tagging said checkpoint state buffer entry with the external instruction ID of the youngest external instruction of said plurality of instructions, and c.) releasing only such data into the architected state cache memory which has an older ID than that youngest one, then the advantage results that the above-mentioned sequence may also contain one or more STORE instructions.

Thus a mixed sequence of register operating and cache operating instructions can be checkpointed per cycle. The disclosed concept is thus not restricted to be focused on register updating instructions only.

The basic idea for synchronization between the checkpoint state update and the store of data into the cache/memory is that all checkpoint states are tagged with the ID of the last external instruction in the checkpointed sequence. The store data is tagged with the ID of the corresponding instruction ID. All STORE data is hold in said Store Buffer until it is released into the cache/memory. Synchronization is obtained if only that STORE data is released into the system memory (i.e. L2 cache), which possesses older or equal IDs compared with the ID of the last checkpoint state used to update the checkpointing array. Store data corresponding to instructions, which are not yet checkpointed into the checkpointing array, is hold in a Store Buffer until the corresponding checkpoint state is used to update the checkpointing array. Thus, it is assured that the contents of the checkpointing array and the data stored in the system memory is consistent all the time. If an error occurs inside the processor no corrupted data has entered the system memory. If the recovery will restore the architected registers by using the checkpointing array and restoring the processor status, e.g. the program counter, the processor will be able to restart program execution without damaging data in the system memory.

When, further the above synchronizing step comprises a double handshake operation between ARA update control and STORE data release control, comprising a first step of:

a.) signaling the youngest external instruction ID to said ARA update control when respective STORE data associated with at least said youngest instruction is residing in said Store Queue, whereby an ARA update is triggered comprising register instructions having an older ID compared to said signaled youngest external instruction ID, and a second step of:

b.) signaling the youngest external instruction ID associated with the latest ARA update to the STORE data release control thus triggering a STORE data release from the Store Buffer to said architected state cache memory, said release comprising STORE data resulting from instructions having an older ID compared to said signaled youngest external instruction ID, then, a preferred way of synchronization is provided because it provides for an efficient and consistent checkpointing system. More details are given with reference to FIG. 6 down below.

The disclosed concept may be advantageously extended for collecting updates of a predetermined extended maximum number of register contents, e.g., a maximum number of 16 register updates, which are performed by a respective complex external instruction, as e.g., a LOAD MULTIPLE instruction updating up to 16 registers in a checkpoint state buffer, preferably by providing the steps of:

a.) reserving a respective extended plurality of checkpoint state buffer entries, e.g., 16/4=4 entries for receiving the register update data, and b.) marking subsequent entries being associated with one and the same complex external instruction with a glue bit, and c.) updating the thus extended checkpoint state in an atomic operation in more than one cycle.

With this feature, very complex external CISC instructions which need to be translated into more than four internal instructions, may be checkpointed in an atomic way, i.e., successfully completed or not at all begun, but within more than one cycle—provided that there is no operation failure, as e.g., a power failure during those checkpoint cycles.

Preferably, a processor unit having logic circuit means for performing the steps of one or more of the above mentioned variations is provided such that the means for collecting updates of a predetermined maximum number of register contents is a checkpoint state buffer with a plurality of entries each of which comprises preferably an instruction ID, a target register address, the target register data, and the program counter. A logic checkpoint state then covers a plurality, preferably four of such entries (see FIGS. 2–4).

In this way, each internal instruction may basically update one register—which is often occurring—, and the buffer is large enough for receiving up to 4 internal instructions. This CSB buffer organization is found to be a good compromise between area consumption and performance gain implied by the increased runtime stability.

Thus, as a person skilled in the art may appreciate that the present invention proposes a new scheme for checkpointing multiple external CISC instructions and ensures consistency between the architected register contents and the data stored in the cache/system main memory.

BRIEF DESCRIPTION OF THE DRAWINGS

These and other objects will be apparent to one skilled in the art from the following detailed description of the invention taken in conjunction with the accompanying drawings in which:

FIG. 7 is a schematic representation illustrating the principle of extended checkpoint states according to the invention.

DESCRIPTION OF THE PREFERRED EMBODIMENT

Figure 2:
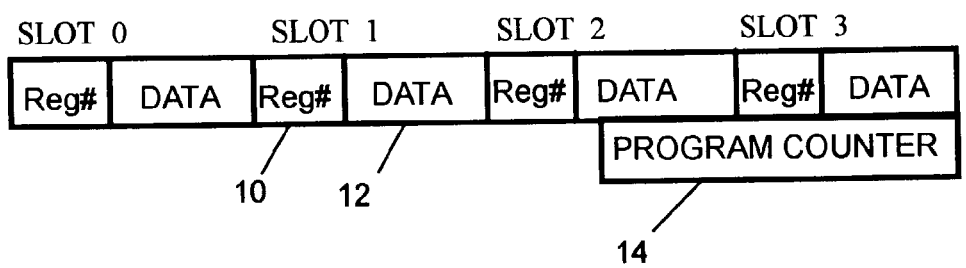
FIG. 2 is a schematic representation of a checkpoint state definition according to the invention.

With general reference to the figures and with special reference now to FIG. 2 an exemplary processor architecture is chosen for illustrating one preferred embodiment of the disclosed concept. This is a processor architecture in which register data is operated on separately from the data to be stored or loaded from or to the caches. The register data 'stream' is operated in a processor part called Instruction Window Buffer (IWB) whereas the Store or Load data 'stream' is operated in a different part, i.e., the Storage Window Buffer (SWB). Both data streams must be made consistent when checkpointing is envisaged. It is to be understood, however, that the disclosed concept covers any other type of processor architecture which implements a different scheme maybe according to other criteria of data separation as long as it is a must for the checkpointing control to hold register data consistent with other system memory data.

An advantageous checkpoint state definition for such IWB/SWB architecture is described in more detail next below.

A checkpoint state comprises as many slots as registers can be updated per cycle. Thus, in an example one CISC instruction may update a number of four registers. Thus, a checkpoint state comprises four slots, i.e., slot 0, slot 1, slot 2 and slot 3 and an additional slot for storing the program counter. Each of the four target slots contains the register address 10 and the respective register data 12.

With this exemplary checkpoint state definition four internal instructions representing up to four external CISC instructions may be retired per cycle. This implies that up to four registers are updated every cycle. In addition, every instruction will update the processor's status, e.g. the program counter stored in slot 14.

For checkpointing several instructions according to the invention only the final status is of importance, i.e., if several external CISC instructions are completed simultaneously the program counter is determined by the last instruction completed within the sequence of external instructions.

Figure 1:
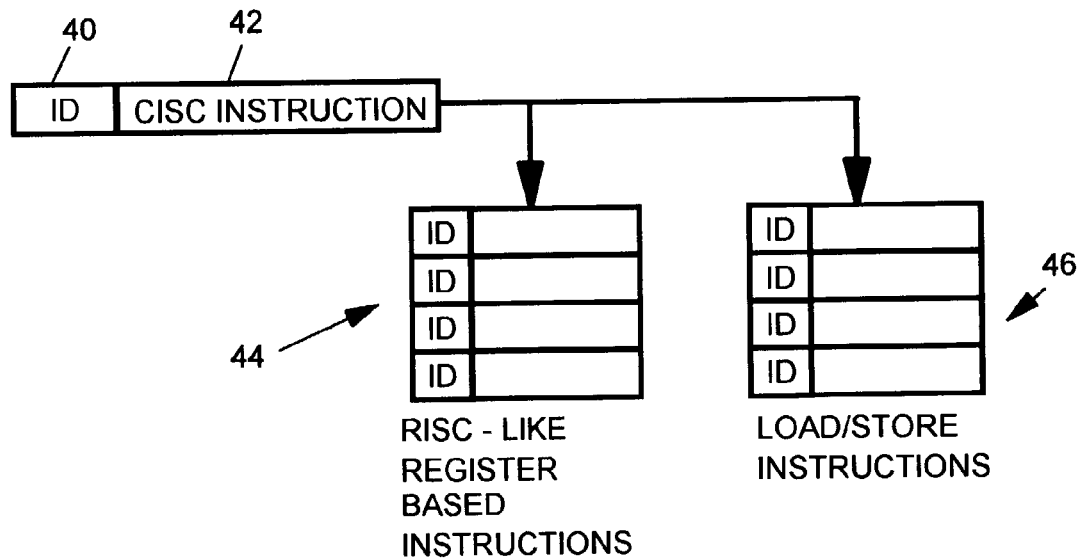
FIG. 1 is a schematic representation illustrating the concept of translating a CISC instruction into several RISC instructions introducing the disclosed instruction ID.
Figure 3:
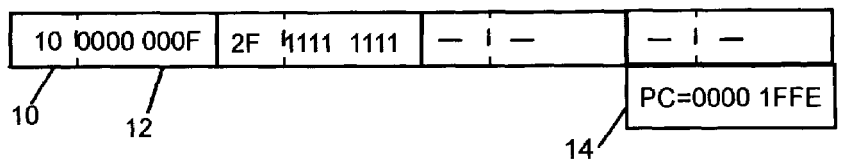
FIG. 3 is a schematic representation of a checkpoint state comprising a CISC instruction, which is translated into 2 internal instructions with two register updates, each.

Two examples are given next below and are discussed with reference to FIGS. 3 and 4 respectively:

A CISC instruction—see FIG. 3, upper part, first column which is translated into four RISC-like instructions corresponding to four lines of the upper part table—writes two target registers by means of the first and third RISC instruction. Thus, it will occupy two slots in the checkpoint state; see bottom part, the both leftmost slots structured as depicted in FIG. 1. The program counter 14 will determine the instruction address of the next sequential instruction. Two slots of the checkpoint state (i.e., the both leftmost slots) are used and marked by a valid bit.

Figure 4:
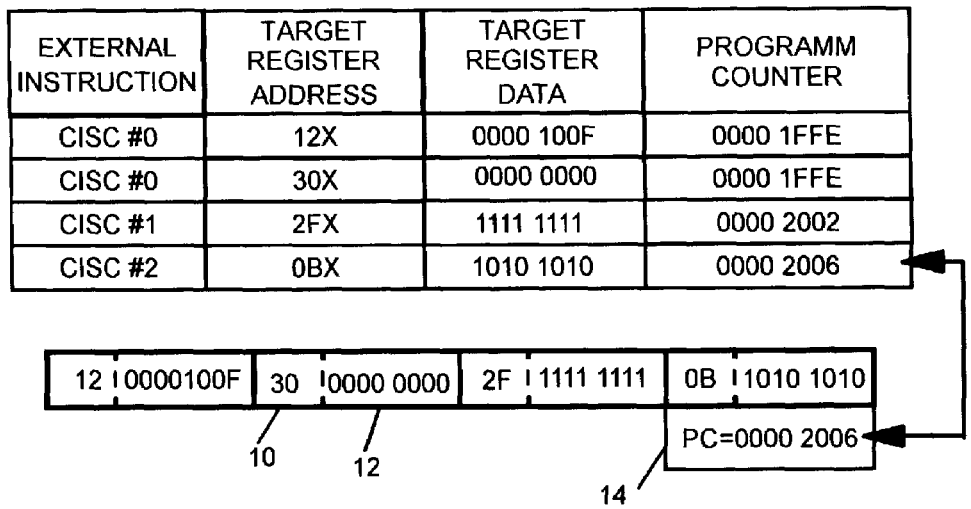
FIG. 4 is a representation according to FIG. 2 with three CISC instruction translated into 4 internal instructions with 2+1+1 register updates.

A further example given in FIG. 4 assumes that three CISC instructions CISC#0, . . . CISC#2 are translated into four RISC-like instructions: In particular, the first CISC#0 instructions is translated into two instructions corresponding to the two uppermost lines in the upper part of FIG. 4, whereas the following CISC#1 and CISC#2 instructions are represented by a single RISC-like instruction covering each only one table row. The sequence will update four registers, thus the corresponding checkpoint state will use four, i.e., all available slots. The status information for this checkpoint is derived from the last instruction in this checkpointed sequence of CISC instructions, i.e., the program counter is extracted from the third instruction, CISC#2.

Figure 5:
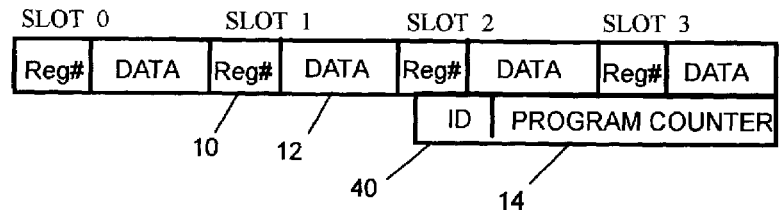
FIG. 5 is a schematic representation of a checkpoint state tagged with the ID of the last checkpointed CISC instruction.
Figure 6:
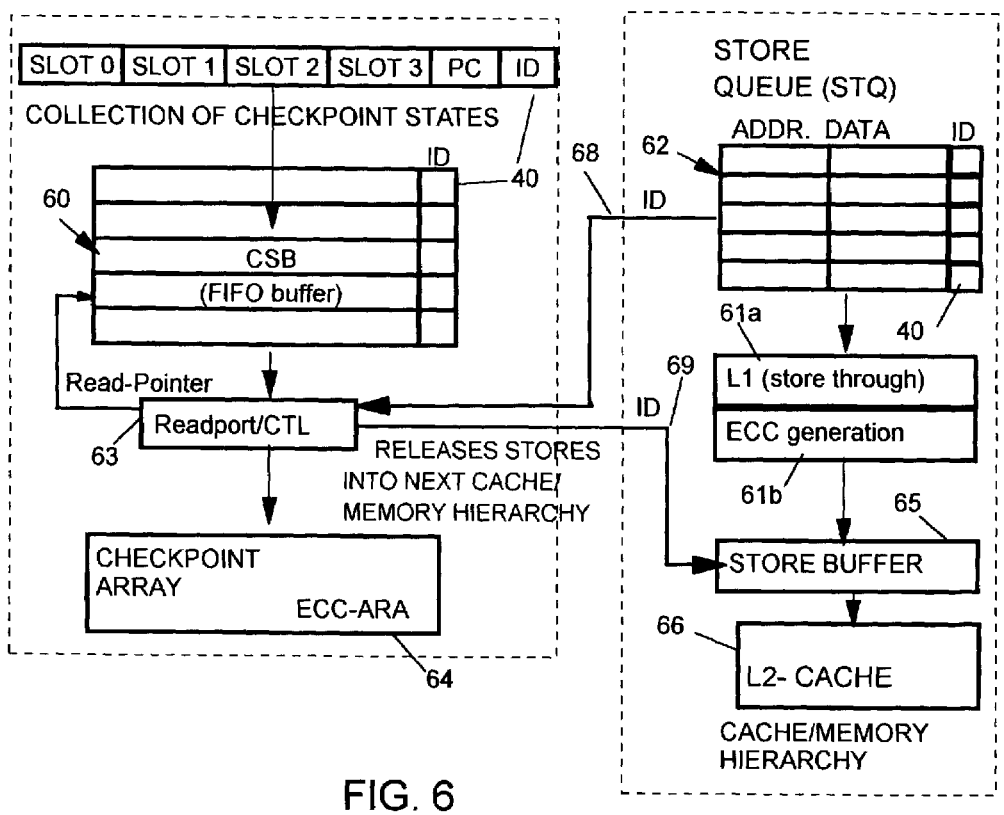
FIG. 6 is a schematic representation illustrating the synchronization of register checkpointing with STORE data processes according to the invention.

With reference now to FIG. 5 and FIG. 6, an additional synchronization mechanism (double handshake) feature is disclosed which can be applied advantageously in microprocessor architectures in which Register data as e.g. Instruction operands and the above mentioned STORE data as e.g., a variable to be stored into the memory is used by one and the same CISC instruction.

Basically, all checkpoint states—refer back to FIG. 2 for basics—are advantageously tagged with the ID 40 of the last external instruction in the checkpointed sequence. This is depicted in FIG. 5 and FIG. 6.

In FIG. 6 the right-hand SWB part comprises all STORE data. In this exemplary STORE Data processing architecture, data as e.g., that one associated with a program variable comes from a Store Queue 62. STORE data is sent to a store-through (or write-through) L1-cache 61*a* and a ECC generation 61*b* covering for example a quadword and corresponding advantageously to a complete L1-cache line containing the new STORE data is subsequently ECC-processed after instruction execution. Then the respective data generation 61*b* is buffered error-free within the Store Buffer 65 which can be preferably located also in a L1-cache department or alternatively near the L1-cache department.

Then said data is released into the L2-cache 66 or other adapted part of the memory hierarchy in a form, which is synchronized, with the release of register data. Said STORE data processing is preferred because data which may eventually be corrected during ECC processing is completely processed on-chip which is more fast compared to ECC processing of data which located off the chip, e.g., in a L2-cache. The left-hand IWB part, however, comprises the checkpoint state buffer 60 and basically the checkpointing array 64 which comprises the error-checked and error-corrected architected Register data. It is thus abbreviated as (ECC-ARA).

Generally, the checkpointing into the checkpointing array 64 (ECC-ARA) is done in an atomic procedure. "Atomic" means, a checkpoint procedure must be expected to be done completely, i.e., finished successfully or it is not allowed to be even begun in order to guarantee a reliable reset point for one or a plurality of processors.

Generally, as long as a checkpoint is not completed no read accesses to the ECC-ARA 64, nor reset functions concerning the ECC-ARA are possible. This guarantees that only complete external instructions are checkpointed into the ECC-ARA.

In particular, a preferred synchronization (double handshake) scheme between updates of the ECC-ARA 64 and the corresponding "architected" memory portion, the L2-cache 66, is as follows: In order to synchronize the register contents stored in the checkpointing array 64 with the data stored in the L2-cache 66 a first synchronization is established between the store queue 62 (STQ) and the checkpoint state buffer 60 (CSB), and another second synchronization between the (control logic of the) checkpointing array 64 (ESS-ARA(and the store buffer 65 (STB).

Assuming an empty store queue 62, checkpointing will always occur if a complete checkpoint state is available in the register address 10 and data 12 as described above with reference to FIG. 3 and FIG. 4 must be present.

If STORE data is found in the STQ 62, and instruction identifier ID will signal—see first handshake signal, are 68—to the CSB 60 which checkpoint states are allowed to be checkpointed into the checkpointing array 64 (ECC- ARA). Thus, this is preferable done via a control logic comprising a MUX element 63 arranged to access the CSB 60 for read and the ECC-ARA 64 for read/write accesses when this is accordingly signaled.

When a checkpoint state has been completely checkpointed into the ECC-ARA 64 the corresponding ID is read out from the CSB 60 or preferably from ECC-ARA 64 via the read port 63 and is then sent—see second handshake signal, arc 69—to the Store Buffer 65, which contains ECC protected STORE data. The STORE data stored in a respective entry of the Store Buffer 65 is released into the L2-cache only if the respective ID has been received from the checkpointing array (ECC-ARA) 64. Thus, this is done after having received the ID. As can be appreciated by a person skilled in the art—when these rules are followed—the memory content of L2-cache 66 is always consistent with the register data found in the ECC-ARA 64. The data associated with the same instruction have the same IDs in each of said storing means 60, 64, 62, 65, and 66.

In other words, a synchronization is basically obtained only if the particular STORE data is released into the system memory which possesses IDs which are older or equal compared with the ID of the last checkpoint state used to update the checkpointing array 64. Store data corresponding to instructions, which are not yet checkpointed into the checkpointing array, is hold until the corresponding checkpoint state is used to update the checkpointing array 64. Thus, it is assured that the contents of the checkpointing array and the data stored in the L2 cache or memory is consistent all the time.

If an error occurs inside the processor no corrupted data has entered the L2 cache or memory. If the recovery will restore the architected registers by using the checkpointing array 64 and restoring the processor status, e.g., the program counter, the processor will be able to restart program execution without damaging data in the system memory, the content of the L1 cache must be purged. It should be noted that all older entries with respect to the ID of the last checkpointed instruction must also be erased in the Store Buffer 65.

It should be added that when the CSB 60 is full the instruction committer will be stopped, thus no new instructions are committed. This leads to a stop of the processor until the Store Queue 62 will store data into the Store Buffer 65.

Further, the ECC-ARA 64 update may occur several cycles after the checkpoint state has been built up. During this time several checkpoint states—preferably one per cycle—can be collected in said checkpoint state buffer (CSB) until the checkpoint states are finally used for a consistent update of the checkpointing array 64. Upon recognition of an error by some prior art error detection logic provided separately, and not being a subject of the present invention, the checkpointing of the next checkpoint states stored in the CSB 60 is immediately blocked. Thus, it is guaranteed that the error will not affect the checkpointing array 64 nor corrupt "correct" data stored in the L2 cache.

Figure 7:
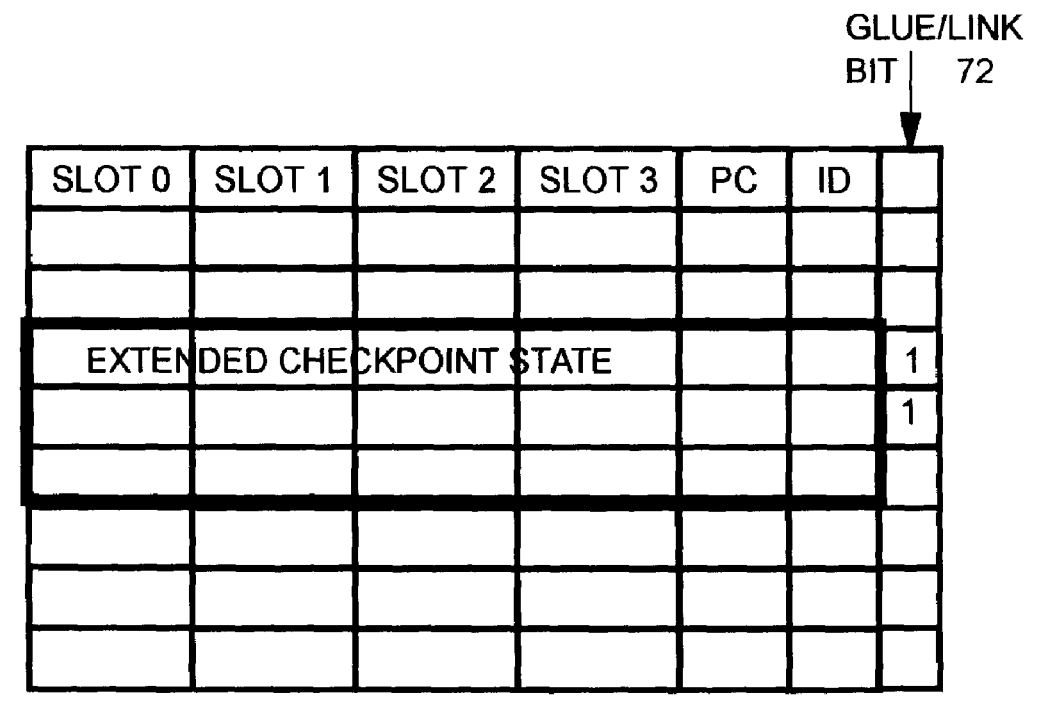

Further, and with reference to FIG. 7, an extension of checkpoint states for very complex external instructions consisting of more than four internal instructions will be disclosed additionally:

If very complex external (CISC) instructions need to be translated into more than four internal instructions under taking profit of the disclosed disclosure then the disclosed scheme is able to be extended without giving up the basic technical disclosed features and without to be constraint to provide a much broader and thus more area-consuming CSB 60 for receiving the respective increased number of internal instructions:

Under this premise the retiring of the complex instruction will last several cycles if only a maximum of four internal instructions can be retired per cycle. This implies that the checkpoint states that are built up every cycle do not represent a complete external instruction and thus must not be used to update the checkpointing array.

The solution for this problem is based on the idea that several checkpoint states are considered to form a single "extended checkpoint state" representing the complex external instruction as a whole.

According to a preferred embodiment these incomplete checkpoint states occupy several entries of the checkpoint state buffer 60. Said several entries preferably form a sequence. A glue/link bit 72 provided at some location in each entry of the checkpoint state buffer 65 marks that consecutive checkpoint states stored in the buffer 65 form an extended checkpoint state, see FIG. 7. Therefore it is necessary that the checkpoint state buffer 65 possesses at least as many entries as are necessary to represent an extended checkpoint state for every possible complete CISC instruction.

Further, the updating of the checkpointing array 64—see back to FIG. 6—must not be interrupted until the atomic operation is updated completely.

Upon detection of an error the update mechanism must not be blocked until the atomic operation is checkpointed completely. This also implies that checkpointing the extended checkpoint state into the checkpointing array 64 may last several cycles.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

As a person skilled in the art may appreciate the present invention proposes a new, advantageous scheme for updating the contents of a checkpointing buffer means as e.g., array 64 for multiple CISC instructions which are retired simultaneously, and for synchronizing the update of the checkpointing buffer means with the release of STORE data into the cache hierarchy as e.g., L2-cache 66 in order to achieve most precise checkpoints of the processors register contents and the data in the system memory. The precise way of checkpointing allows recovery of the processor upon detection of soft or hard errors in the processor without corrupting the data stored in the memory. This is considered as important for satisfying increased level computing requirements.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for checkpointing a multiple-processor data processing system in order to provide for error-recovery, said method comprising the steps of:
   collecting updates of a predetermined maximum number of register contents performed by a respective plurality of CISC or RISC instructions in a checkpoint state buffer, a checkpoint state comprising as many buffering slots as registers can be updated by said plurality of CISC instructions and an entry for a Program Counter value associated with the youngest external instruction of said plurality of CISC instructions; and updating an Architected Register Array (ARA) with currently collected register data after determining that no error was detected in the register data prior or with the completion of said youngest external instruction of said plurality of external instructions.

2. The method according to claim 1 further comprising the step of providing Error Detection and correction bits with the ARA entries.

3. The method according to claim 1 further comprising the steps of: providing in parallel to said ARA update a second control path which controls the release of STORE data resulting from a plurality of STORE instructions from a Store Buffer into an architected state cache memory;

synchronizing said STORE data release with said ARA update by tagging said checkpoint state buffer entry with the external instruction ID of the youngest external instruction of said plurality of instructions; and releasing only such data into architected state cache memory which has an older or equal ID than that youngest one.

4. The method according to claim 3 in which the synchronizing step comprises a double handshake operation between an ARA update control and STORE data release control, wherein said double handshake operation comprises the steps of:

signaling the youngest external instruction ID to said ARA update control when respective STORE data associated with at least said youngest instruction is residing in said Store Buffer, whereby an ARA update is triggered comprising register instructions having an older ID compared to said signaled youngest external instruction ID; and signaling the youngest external instruction ID associated with the latest ARA update to the STORE data release control thus triggering a STORE data release from the Store Buffer to said architected state cache memory, said release comprising STORE data resulting from instructions having an older ID compared to said signaled youngest external instruction ID.

5. The method according to claim 1 including collecting updates of a predetermined extended maximum number of register contents performed by a respective complex external instruction in a checkpoint state buffer, comprising the steps of:

reserving a respective extended plurality of checkpoint state buffer (60) entries for receiving the register update data; marking subsequent entries being associated with one and the same complex external instruction with a glue bit; and updating the thus extended checkpoint state in an atomic operation in more than one cycle.

6. In a system for checkpointing a multiple-processor data processing system in order to provide for error-recovery, a logic circuit comprising:

a checkpoint state buffer collecting updates of a predetermined maximum number of register contents performed by a respective plurality of instructions, said checkpoint state buffer comprising as many buffering slots as registers being updated by said plurality of instructions; an entry for a Program Counter value associated with the youngest external instruction of said plurality of instructions; and an Architected Register Array (ARA) updated with currently collected register data after determining that no error was detected in the register data prior or with the completion of said youngest instruction of said plurality of instructions, and further comprising:

a Store Buffer; an architected state cache memory; and a second control path in parallel to said ARA update which controls the release of STORE data resulting from a plurality of STORE instructions from said Store Buffer into said architected state cache memory, said STORE data release being synchronized with said ARA update by tagging said checkpoint state buffer entry with the instruction ID of the youngest instruction of said plurality of instructions, and wherein only such data is released into architected state cache memory which has an older or equal ID than that youngest one.

7. The logic circuit according to claim 6 wherein said second control path further comprises a double handshake operation during said synchronizing between an ARA update and STORE data release, wherein said double handshake operation comprises:

a first signal generator signaling the youngest external instruction ID to said ARA update control when respective STORE data associated with at least said youngest instruction is residing in said Store Buffer, whereby an ARA update is triggered comprising register instructions having an older ID compared to said signaled youngest external instruction ID; and a second signal generator signaling the youngest external instruction ID associated with the latest ARA update to the STORE data release control thus triggering a STORE data release from the Store Buffer to said architected state cache memory, said release comprising STORE data resulting from instructions having an older ID compared to said signaled youngest external instruction ID.

8. In a system for checkpointing a multiple-processor data processing system in order to provide for error-recovery, a logic circuit comprising:

a checkpoint state buffer collecting updates of a predetermined maximum number of register contents performed by a respective plurality of instructions, said checkpoint state buffer comprising as many buffering slots as registers being updated by said plurality of instructions; an entry for a Program Counter value associated with the youngest external instruction of said plurality of instructions; and an Architected Register Array (ARA) undated with currently collected register data after determining that no error was detected in the register data prior or with the completion of said youngest instruction of said plurality of instructions, further comprising: a checkpoint state buffer having multiple entries; a complex external instruction collecting updates of a predetermined extended maximum number of register contents in said checkpoint state buffer, wherein said complex external instruction: reserves a respective extended plurality of checkpoint state buffer entries for receiving the register update data; marks subsequent entries being associated with one and the same complex external instruction with a glue bit; and updates the thus extended checkpoint state in an atomic operation in more than one cycle.

9. The logic circuit according to claim 8
wherein said checkpoint state buffer comprises a plurality of buffer entries, each of which comprises an instruction ID, a target register address, target register data, and a program counter,
whereby a checkpoint state covers a plurality of preferably four entries.

10. A data processing system comprising:
multiple processors; a checkpointing logic circuit providing for error-recovery;
a checkpoint state buffer in said checkpointing logic circuit collecting updates of a predetermined maximum number of register contents performed by a respective plurality of instructions, said checkpoint state buffer comprising as many buffering slots as registers being updated by said plurality of instructions; an entry for a Program Counter value associated with the youngest external instruction of said plurality of instructions; and
an Architected Register Array (ARA) updated with currently collected register data after determining that no error was detected in the register data prior or with the completion of said youngest instruction of said plurality of instructions, further comprising: a Store Buffer; an architected state cache memory; and a second control path in parallel to said ARA update which controls the release of STORE data resulting from a plurality of STORE instructions from said Store Buffer into said architected state cache memory, said STORE data release being synchronized with said ARA update by tagging said checkpoint state buffer entry with the instruction ID of the youngest instruction of said plurality of instructions, and wherein only such data is released into architected state cache memory which has an older or equal ID than that youngest one.

11. The data processing system according to claim 10
wherein said second control path further comprises a double handshake operation during said synchronizing between an ARA update and STORE data release, wherein said double handshake operation comprises:

a first signal generator signaling the youngest external instruction ID to said ARA update control when respective STORE data associated with at least said youngest instruction is residing in said Store Buffer, whereby an ARA update is triggered comprising register instructions having an older ID compared to said signaled youngest external instruction ID; and a second signal generator signaling the youngest external instruction ID associated with the latest ARA update to the STORE data release control thus triggering a STORE data release from the Store Suffer to said architected state cache memory, said release comprising STORE data resulting from instructions having an older ID compared to said signaled youngest external instruction ID.

12. The data processing system according to claim 10 further comprising: a checkpoint state buffer having multiple entries; a complex external instruction collecting updates of a predetermined extended maximum number of register contents in said checkpoint state buffer, wherein said complex external instruction: reserves a respective extended plurality of checkpoint state buffer entries for receiving, the register update data; marks subsequent entries being associated with one and the sane complex external instruction with a glue bit; and updates the thus extended checkpoint state in an atomic operation in more than one cycle.

13. The data processing system according to claim 12
wherein said checkpoint state buffer comprises a plurality of buffer entries, each of which comprises an instruction ID, a target register address, target register data, and a program counter,
whereby a checkpoint state covers a plurality of preferably four entries.

* * * * *